US012583680B2

(12) United States Patent
Yamashita et al.

(10) Patent No.: US 12,583,680 B2
(45) Date of Patent: Mar. 24, 2026

(54) WAREHOUSE FOR ORDER FULFILMENT WITH A PRODUCT STORAGE AND AT LEAST ONE ORDER FULFILLMENT AREA

(71) Applicant: Dematic GmbH, Heusenstamm (DE)

(72) Inventors: Shin Yamashita, Oberursel (DE);
Hiroki Shinohara, Urayasu (JP);
Daniel Huberth, Aschaffenburg (DE)

(73) Assignee: Dematic GmbH, Heusenstamm (DE)

( * ) Notice: Subject to any disclaimer, the term of this patent is extended or adjusted under 35 U.S.C. 154(b) by 690 days.

(21) Appl. No.: 17/923,703

(22) PCT Filed: May 8, 2020

(86) PCT No.: PCT/EP2020/062891
§ 371 (c)(1),
(2) Date: Nov. 7, 2022

(87) PCT Pub. No.: WO2021/223885
PCT Pub. Date: Nov. 11, 2021

(65) Prior Publication Data
US 2023/0202760 A1 Jun. 29, 2023

(51) Int. Cl.
*B65G 1/137* (2006.01)
(52) U.S. Cl.
CPC .................................. *B65G 1/1378* (2013.01)
(58) Field of Classification Search
CPC .................................................... B65G 1/1378
See application file for complete search history.

(56) References Cited

U.S. PATENT DOCUMENTS

| | | | |
|---|---|---|---|
| 8,117,764 | B2 | 2/2012 | Ness et al. |
| 2012/0282068 | A1 | 11/2012 | Tschurwald et al. |
| 2015/0104286 | A1 | 4/2015 | Hansl et al. |
| 2015/0114799 | A1 | 4/2015 | Hansl et al. |

(Continued)

FOREIGN PATENT DOCUMENTS

| | | |
|---|---|---|
| CA | 3039328 A1 | 10/2019 |
| DE | 10200077 A1 | 12/2002 |

(Continued)

OTHER PUBLICATIONS

International Search Report and Written Opinion of the International Searching Authority in English from corresponding Patent Cooperation Treaty (PCT) Application No. PCT/EP2020/062891, indicated completed on Dec. 22, 2020.

*Primary Examiner* — Kyle O Logan
(74) *Attorney, Agent, or Firm* — Gardner, Linn, Burkhart Ondersma LLP

(57) ABSTRACT

A warehouse for order fulfilment with at least one order fulfillment area in which picking stations are arranged and supplied with articles from a product storage for picking orders wherein each picking station is supplied and collected with product containers by a connecting conveyor system and the connecting conveyor system also supplying order containers and being used for discharge of emptied product containers and partial order or finished orders from the respective picking station, where a bypass conveyor is arranged in parallel to the connecting conveyor system such that product and/or order traffic inbound to the picking stations and outbound from the picking stations may be off-loaded from the connecting conveyor system.

18 Claims, 11 Drawing Sheets

(56)　　　　　　References Cited

U.S. PATENT DOCUMENTS

| | | | |
|---|---|---|---|
| 2016/0355340 A1 | 12/2016 | Meurer | |
| 2018/0009605 A1 * | 1/2018 | Collin et al. | |
| 2020/0148472 A1 * | 5/2020 | Collin | .................. B65G 1/0485 |
| 2021/0130099 A1 * | 5/2021 | Collin | .................... B65G 47/68 |
| 2024/0425284 A1 * | 12/2024 | Schauer | .................... B66F 9/02 |

FOREIGN PATENT DOCUMENTS

| | | | |
|---|---|---|---|
| DE | 10136354 | B4 | 6/2010 |
| DE | 102018114026 | A1 | 12/2019 |
| EP | 0092848 | A2 | 11/1983 |
| EP | 1179491 | A1 | 2/2002 |
| EP | 1886943 | A1 | 2/2008 |
| EP | 2769936 | A1 | 8/2014 |
| JP | H0753017 | A | 2/1995 |
| JP | 2017030974 | A | 2/2017 |
| JP | 2018127344 | A | 8/2018 |
| JP | 2019505454 | A | 2/2019 |
| JP | 2020526463 | A | 8/2020 |
| JP | 2020526464 | A | 8/2020 |
| WO | 2012069327 | A1 | 5/2012 |
| WO | 2017102315 | A1 | 6/2017 |
| WO | 2017110499 | A1 | 6/2017 |
| WO | 2018006112 | A1 | 1/2018 |
| WO | 2019008084 | A1 | 1/2019 |
| WO | 2019008097 | A1 | 1/2019 |
| WO | 2020066885 | A1 | 4/2020 |
| WO | 2020113249 | A1 | 6/2020 |

* cited by examiner

WAREHOUSE FOR ORDER FULFILMENT WITH A PRODUCT STORAGE AND AT LEAST ONE ORDER FULFILLMENT AREA

CROSS REFERENCE TO RELATED APPLICATION

The present application claims the priority benefits of International Patent Application No. PCT/EP2020/062891, filed May 8, 2020.

BACKGROUND AND FIELD OF THE INVENTION

The invention relates to a warehouse for order fulfilment.

In such warehouses picking stations are arranged and supplied with articles from the product storage for picking orders and also with order containers. Often each picking station is supplied with articles from the product storage by a connecting conveyor system connecting the storage and/or another operating area e.g. receiving, picking zone, order buffering and shipping with the order fulfillment area and picking stations therein. Usually these are arranged between the storage and order fulfillment area, in the so-called front-zone, said front-zone including a cross-aisle conveyor running the length of the front of the storage segmenting the front-zone. Alternatively or additionally the connecting conveyor system may connect to a conveyor loop transporting goods from storage to order fulfillment area and/or any conveying system irrespective of where the goods are conveyed from (originate) and transported to (dispatched).

It is generally known to operate picking stations for picking according to the goods-to-person principle. In that case, the goods or articles for an order are transported from the storage, usually a larger racking arrangement, to the respective picking station, for which purpose they are usually transported in containers (totes, trays etc.). At that location, they are removed from the so-called storage or product containers and placed into the corresponding containers of an order, so-called order containers according to the order detailed to the operator based on the list of items in the respective order list. Likewise, order containers are transported from order container induction, former picking zones and/or order buffer to the fulfillment area or picking stations respectively.

Throughput capability of the storage and retrieval machines (ASRS) and order fulfillment systems including picking station, pick zones, order buffers are constantly improving in performance as technology becomes more sophisticated.

The transportation of those containers is usually implemented by a connecting conveyor system that includes bridging conveyors connecting the storage to the picking stations themselves and further includes a cross aisle conveyor running the length of the front zone of the storage past all aisles and mostly further on to a packaging area and product conveyor loop if order fulfillment areas are not located directly in front of the storage aisles and/or routing conveyor connecting each warehouse zones including order container induction area, another picking zones and order buffers.

This cross aisle conveyor therefore divides the pre-zone or front zone, i.e. area between the storage and the order fulfilment area with the picking stations. In this sense the connecting conveyors must bridge to access the order fulfilment area. On the other hand, they also need to be connected to the cross aisle conveyor for exchange therewith.

The cross aisle conveyor does not only transport articles to the order fulfilment area and discharge orders therefrom directly opposite the corresponding aisle of the storage racking but also distributes articles and partial orders from and to different zones of the storage and also order fulfilment area.

As a result and due to the high load created, the cross aisle conveyor becomes a bottleneck limiting scalability of the system.

US 2012/0282068 A1 discloses a shelf storage system comprising shelves having several shelf levels arranged on top of each other. Each shelf level has at least one transport aisle between the shelves with storage spaces for products. In the transport aisle, a level operating device for moving to the storage spaces is provided. At least two lifts take products to the shelf levels and fetch them from there. A conveyor transports products toward the lifts and away from them. The lifts are, in each case, connected both to a supplying and to a removing conveyor and thus are, in each case, designed both for receiving products from the conveyor and for supplying these products to the shelf levels as well as for removing products from the shelf levels and transferring these products onto the conveyor. The special design incorporates lifts having duplicate load platforms for servicing different levels at the same time, by being vertically positioned above each other as best shown in FIG. 5.

DE 10 2018 114 026 A1 discloses a warehouse and picking system having a control device, which is designed to carry out two-stage picking of articles, wherein the two-stage picking comprises a first, article-oriented picking stage and a second, order-oriented picking stage. A sorter, which comprises a loop-shaped main section, which is continually operated, is located between the storage and order fulfilment area, i.e. in the front-zone. At least one secondary section, wherein each of the secondary sections is coupled to the main section, preferably in a mesh-shaped manner, and is discontinuously operable; and a plurality of sorter trays, wherein each of the trays is designed to be moved along the sections and fed into and out of the main section; one or more separating stations are disclosed. Each of the separating stations is coupled via one of the secondary sections to the main section and is coupled to the warehouse in order to be supplied with warehouse containers. It is also designed for transferring the articles from the warehouse containers to the trays, in order to transfer each of the articles in the first picking stage on an order-line basis and/or individually onto one of the trays, which is located on the one secondary section. A plurality of automated and/or manually operated target points for the second picking stage are included, wherein each of the target points is coupled to one of the secondary sections; and/or directly to the main section.

The throughput performance of the front-zone cross aisle conveyor remains limited. In part, the reason is that each AS/RS aisle needs to have at least a pair of inbound and outbound conveyors that need to be diverted from/merged into the cross aisle conveyor within the given space, typically within single aisle width of the storage. This makes it difficult to use high speed merge/divert mechanisms, such as 30/45 degree merges and/or diverts.

In addition, each picking station (GTP) is often connected to the front-zone conveyor as an integral part of GTP subsystems. This also requires loads to be diverted to the picking station and merged back to cross aisle conveyor very intensively within the given space, typically within AS/RS single aisle width (as above). This provides the same system design necessities to inbound/outbound conveyors. Additionally, GTP infeed and outfeed lines are often aligned to storage inbound and outbound conveyor lines providing passing through conveying flow from/to AS/RS to/from GTP stations. This prevents use of angled divert/merge.

SUMMARY OF THE INVENTION

The present invention provides a simple connecting conveyor system solution providing high throughput.

In accordance with an aspect of the invention, it has been recognized, that if a bypass conveyor is arranged in parallel to the connecting conveyor system such that product and/or order traffic inbound to the picking stations and outbound from the picking stations may be off-loaded from the connecting conveyor system, the connecting conveyor system can be relieved and throughput increased at the same time. In other words, if a conveyor line running in parallel to the connecting conveyor system is present, it becomes possible to route transported loads not needed in a certain zone or area to which the connecting conveyor systems leads, by offloading such traffic to the bypass conveyor.

Such traffic or material flow may include supply and/or discharge of articles from the product storage for picking orders and also supply and/or discharge of order containers. This is especially true for finished orders that are dispatched from the order fulfilment area. In other words, supplying, routing and taking away of order containers as well as feeding (to the picking stations) new articles as product donors from a receiving area and taking away emptied product containers (from the picking stations) may all be offloaded to the bypass conveyor. Partial order containers might be provided from a previous pre-picking, e.g. another picking station, different picking zone, manual pick area etc.

In one preferred embodiment the connecting conveyor system is a conveyor system arranged between the product storages and the order fulfillment areas and picking stations therein. This may include but is not limited to the arrangement of the connecting conveyor in the so-called front-zone. It is also possible to arrange the connecting conveyor system so as to be connected to a conveyor loop transporting product from storage to order fulfillment area and/or any further conveying system irrespective of where the products conveyed from (originate) and transported to (dispatched). In a preferred embodiment, the connecting conveyor system is a cross-aisle conveyor running the length of the front of the storage segmenting the pre-zone (front-zone).

In one embodiment, the bypass conveyor(s) is/are located below or above, possibly directly underneath or directly above the connecting conveyor system, especially cross-aisle conveyor. In a further embodiment, the bypass conveyor(s) is/are located below or above, possibly diagonally underneath or above the connecting conveyor system, especially cross-aisle conveyor.

In another embodiment, the bypass conveyor(s) is/are located below or above, possibly both directly and diagonally underneath or above the connecting conveyor system, especially cross-aisle conveyor. The bypass conveyor(s) may be connected to the connecting conveyor system, especially cross-aisle conveyor by means of inclined or declined conveyors, ramps or lifts, especially at intervals. The bypass conveyor(s) may be connected with the inclined and declined conveyors by a right angle transfer, tilted conveyor mechanism and/or an angled merge/divert mechanism. The lift can be a single cycling or a tandem cycling lift.

In yet a further embodiment, a bypass conveyor may be located in the same plane as the connecting conveyor system, especially cross-aisle conveyor and be connected by connection conveyors running at 90 degree angles between those two conveyors.

A plurality of bypass conveyors may run in parallel and be connected to the connecting conveyor system, especially cross-aisle conveyor by lifts, e.g. single cycling or tandem cycling lifts.

In again a further embodiment, the bypass conveyor may located horizontally between the end of the storage and the first connecting conveyor system, especially cross-aisle conveyor. The bypass conveyor and the connecting conveyor system, especially cross-aisle conveyor may have the same or opposite conveying direction.

Summarizing, induction and/or discharge of loads to and/or from the connecting conveyor system and/or to and from the at least one bypass conveyor is realized by means of inclined and declined conveyors, tandem cycling lifts, tilted conveyor or right angle transfers (RAT).

Further features and details of the invention are apparent from the description hereinafter in connection with the drawings.

DESCRIPTION OF THE PREFERRED EMBODIMENTS

Figure 1:
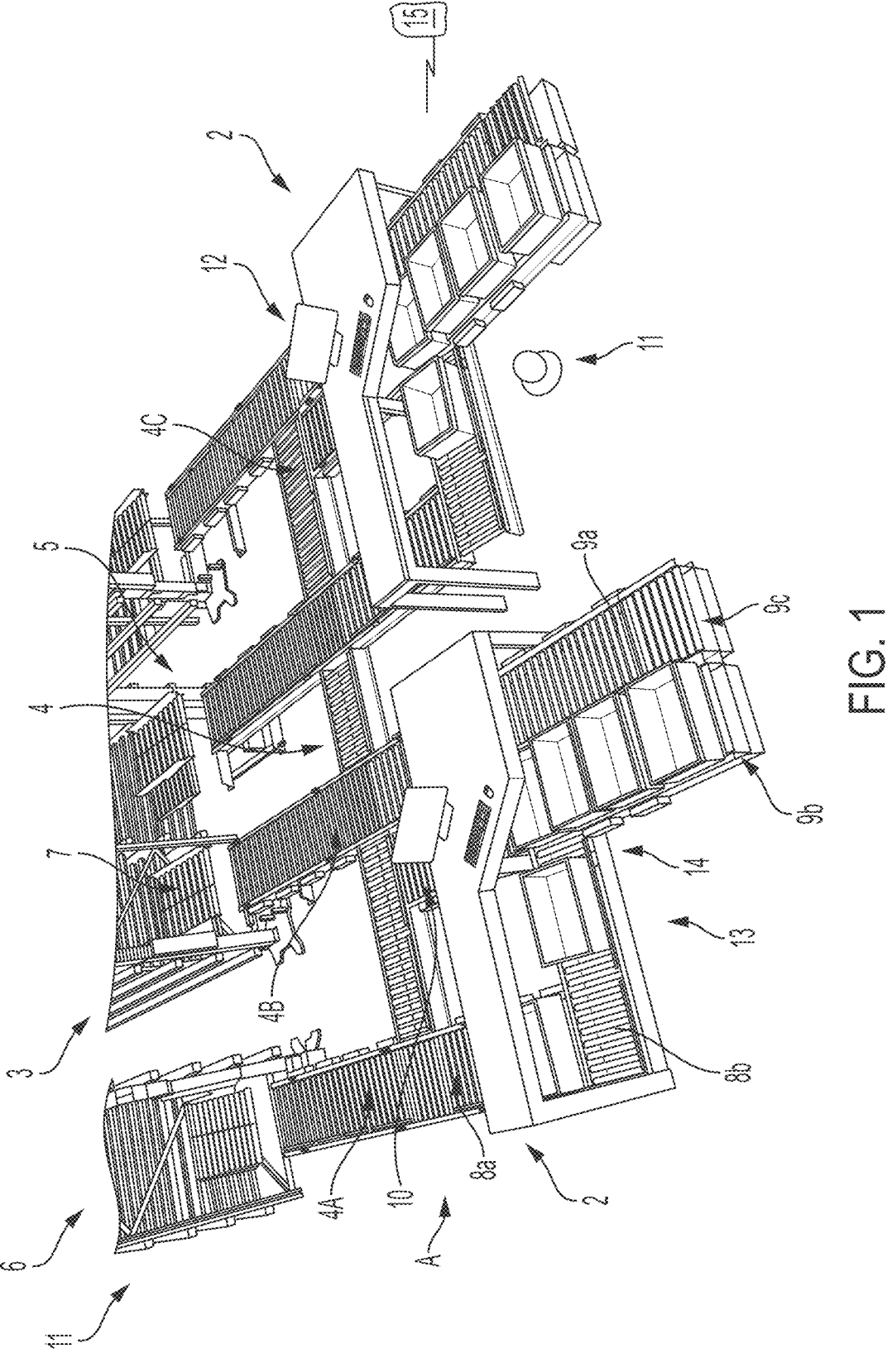
FIG. 1 shows a schematic perspective view of a picking area with two picking stations according for general reference.

In FIG. 1 a schematic perspective view of a picking area 1 with two picking stations 2 that are connected to a racking 3 by conveyors 4 in an order fulfillment area A is shown. Each picking station 2 corresponds to an aisle 5 of the racking 3 with the racks 6 neighboring the aisle 5 in between and is connected to a load carrier vertical conveyor 7 (e.g. a lift or elevator) arranged within the footprint of each rack 6 at its front end via the conveyors 4. The racks are serviced by ASRS machines not shown, e.g. shuttles, that drop off loads to the vertical conveyors 7. Conveyor 4c is a connecting conveyor system in the form of a cross aisle conveyor running the length of the front of the racking 3 across all aisles 5 and possibly on to a not shown packaging area.

The conveyors 4a, b bridge the racking 3 and the picking stations 2, connecting to an inbound product load carrier conveyor 8a, b and an inbound order load carrier conveyor 9a, b and a common take away discharge conveyor 10. The load carriers themselves can for example be standard containers or trays.

Inbound product load carrier conveyor 8 has a first conveying section 8a leading into the station in extension of the aisle direction and a second conveying section 8b oriented 90 degrees thereto forming the actual conveying system within the station for presentation of the load carriers with products to pick from to the operator 11.

Inbound order load carrier conveyor 9 has a first inbound conveying section 9a leading into the station in extension of the aisle direction and a second conveying section 9b which is arranged in parallel thereto connected by a right-angle-transfer (RAT) 9c.

Product load carrier conveyor section 8b and load carrier conveyor section 9b intersect each other forming an operating position 13 for the operator and intersection 14. The intersection can be formed in a wide range of angles, but usually will be in the range between 60 and 120 degrees, preferably 90 degrees. Common take away discharge conveyor 10 is arranged in direct extension of order load carrier conveyor section 9b and starts at the intersection 14 with product load carrier conveyor section 8b.

Each pick station 2 may include a display and controls 12 for information of and control by the operator 11. The operator may also be guided by other means, like pick-by-voice and virtual reality etc. The picking station may also not have any such means and picking may be performed based on "paper".

Product load carrier conveyor section 8b as a whole may be tilted towards the operating position 13. Another optimization in relation to presentation may be to tilt pick and/or put position. Tilting of the donor position is done by means of tilting conveyor 8b itself allowing the product load carrier to be tilted when it is transferred from 8a to 8b. Tilting of order positions can be done by means of active tilting mechanism e.g. tilted RAT (Right Angle Transfer) and only the corresponding put position can be tilted (adaptive tilting) providing operator a distinct indication where the picked items are put to.

The conveyors are controlled by controller 15 to provide a simultaneous and continuous conveyance flow of product and order carriers through the picking station 2 on the respective conveyors 8, 9 and 10 in accordance with the needs for order fulfilment, which in turn is managed by an overall warehouse management system (WMS) interacting and interfaced with an order tracking system. Obviously also the controller is used to control overall material flow within the racking 3 and 5 and from there to the picking stations 2 and 3.

In the following schematic FIGS. 2-11 disclose variations in design and operation of analogous picking stations 2 according to the invention are described, especially with respect to the use of the bypass conveyor and the connecting area of the cross aisle and bypass conveyors.

Figure 2:
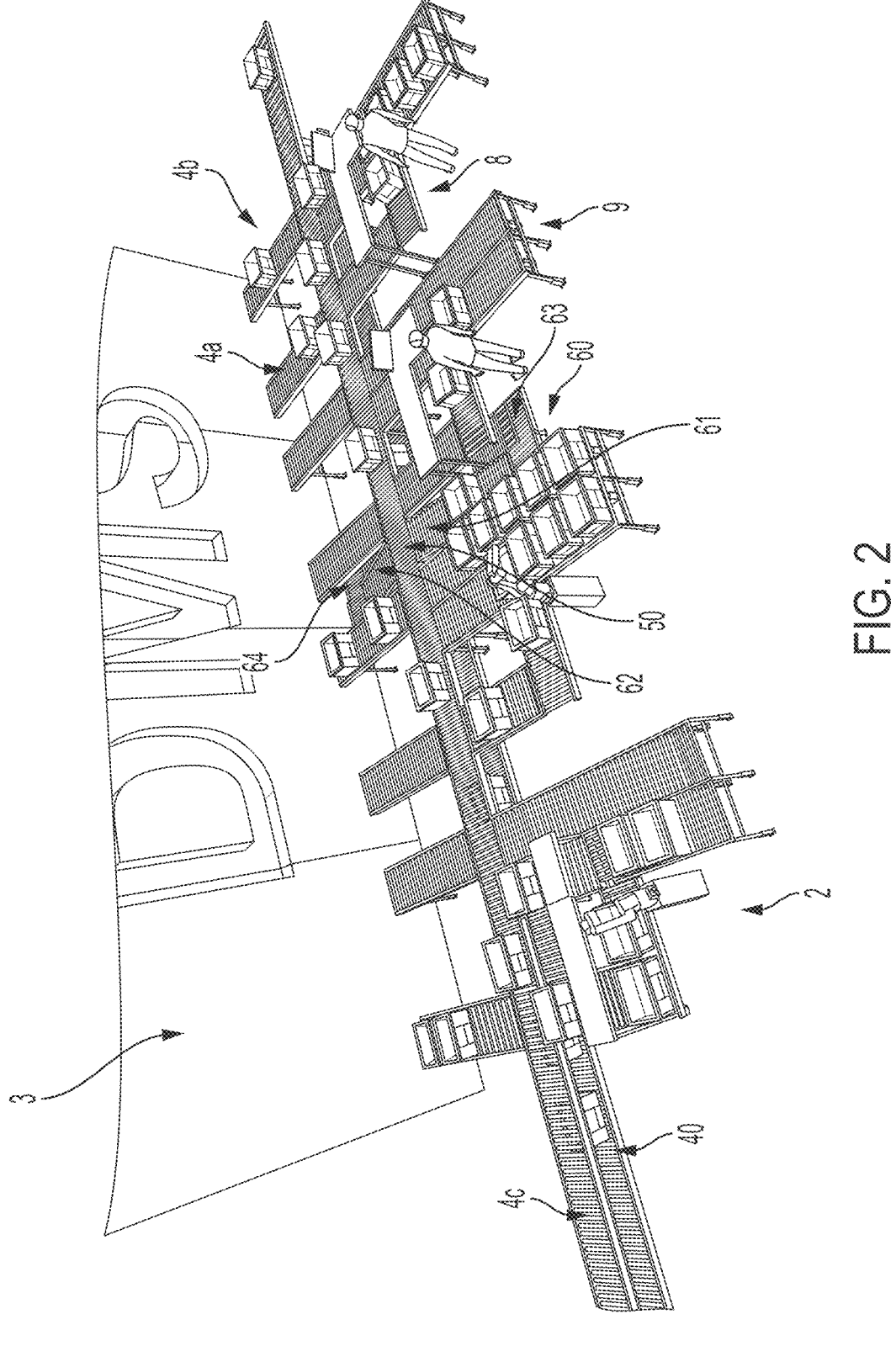
FIG. 2 shows a schematic perspective view of front-zone of a warehouse according to the invention.

In FIG. 2 the order fulfilment area A is shown in an embodiment according to the invention. The racking 3 is only schematically indicated with 3 and the picking stations 2 are manually or robotically operated. A connecting conveyor system 4 with cross aisle conveyor 4c runs the length of the front of the racking 3 across all aisles 5 and possibly on to a not shown packaging area with conveyors 4a, b bridging the racking 3 and the picking stations 2, connecting to an inbound product load carrier conveyor 8a, b and an inbound order load carrier conveyor 9a, b and a common take away discharge conveyor 10. All these installations are basically the same as explained with reference to FIG. 1.

According to an aspect of the invention, a bypass conveyor 40 is located directly beneath the cross aisle conveyor 4c running parallel and with same direction of flow. In the depicted embodiment, the bypass conveyor 40 is connected to the cross aisle conveyor 4c in a connection area 50 by means of a connection installation 60, which is detailed in FIG. 5.

The connection installation 60 is comprised of an inclined conveyor ramp 61 leading in the direction of the picking stations 2 and a declined conveyor ramp 62 leading in the direction of the storage 3, or vice versa both starting at the cross aisle conveyor 4c. Loads are transferred between the ramps 61, 62 and the cross aisle conveyor 4c by RATs embedded in a connection area 50 (not shown). Ramps 61 and 62 are connected with the bypass conveyor 40 by right angle transfer or tilted conveyor mechanisms 63/64 and a further conveyor section 65/66 (see FIG. 5) ending at the bypass conveyor 40. Loads are also transferred between the sections 65, 66 and the bypass conveyor 40 by RATs or tilted conveyor embedded in a connection area (not shown).

Figures 3A, 3B:
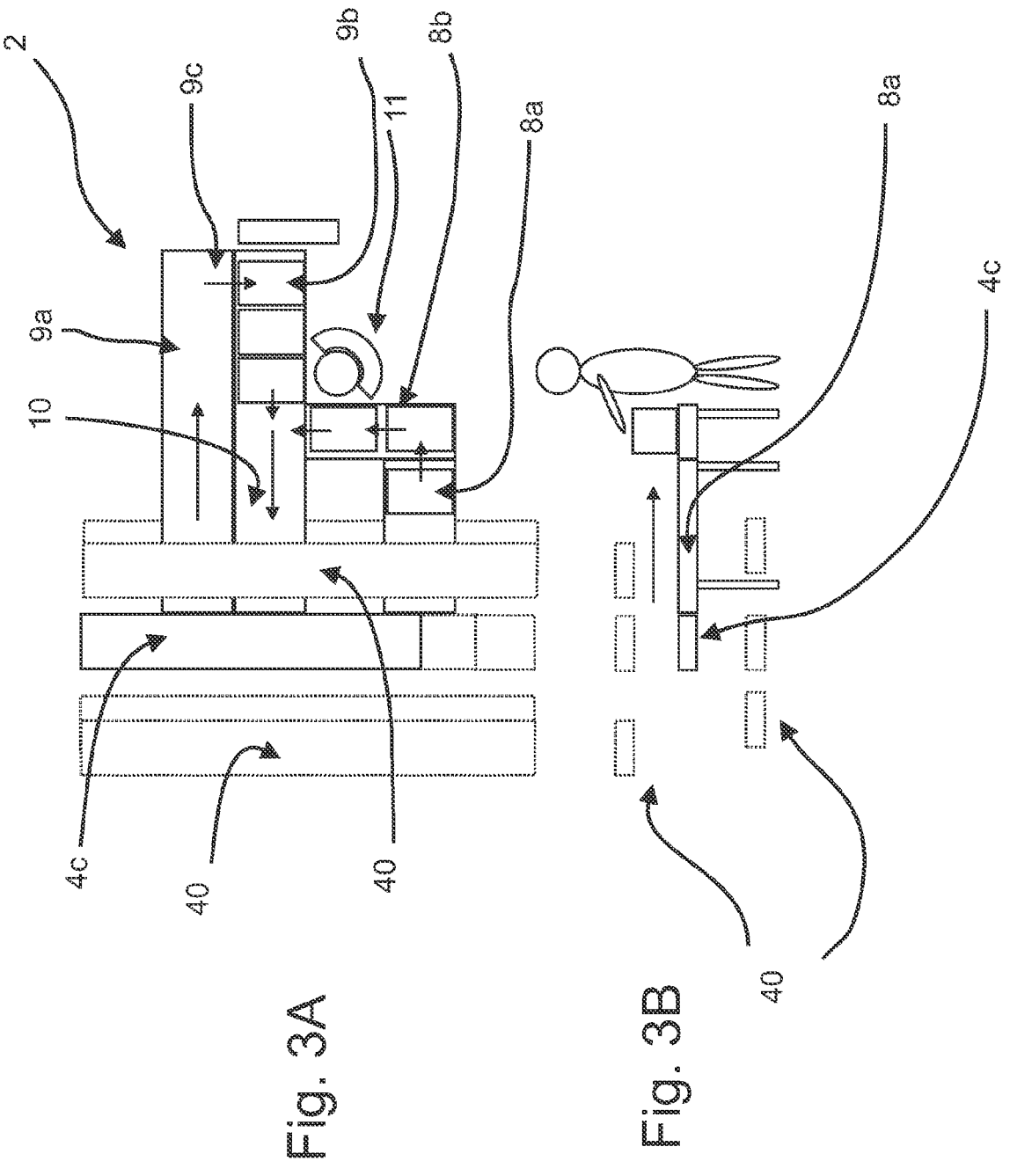
FIGS. 3A and 3B show a schematic plan and side view of a cross aisle and bypass conveyor configuration and connection to picking station according to the invention.

In FIG. 3 a corresponding picking station 2 is shown together with several possible installation versions of the bypass conveyor 40, that are hashed to indicate such. As can be seen, the bypass conveyor 40 may be positioned directly above or directly below the connecting conveyor 4c. It is also possible to position the bypass conveyor 40 below or above the connecting conveyor 4c in a diagonal arrangement, i.e. not having vertical lines through the respective longitudinal center axis being inline with each other, but rather parallel.

FIG. 4 differs from the situation in FIG. 3 with the bypass conveyor 40 being directly above or below the connecting conveyor 4c in that two bypass conveyors 40 and 40* are present, one above and one below the corresponding connecting conveyor 4c and 4c*. This arrangement is beneficial as, similar to the arrangement in FIG. 2, an order fulfillment area 1000 is shown that includes the lower order fulfilment level A as described above with respect to FIG. 1 and additionally a virtual order fulfilment level B including further picking stations 20 and connecting conveyor systems 4c*, all vertically spaced above the order fulfilment level A.

Same as in FIG. 1, the order fulfilment levels A contains picking stations 2 that are connected to a racking (not shown) by conveyors 4a, b in order fulfillment level A and additionally the order fulfilment levels B contains picking stations 20 that are connected to a racking (not shown) by conveyors 4*a, b in virtual order fulfillment level B. As above in FIG. 1, each picking station corresponds to an aisle 5 (see FIG. 1) of the racking 3 (see FIG. 1) with the racks 6 (see FIG. 1) neighboring the aisle 5 (see FIG. 1) in between and is connected to a load carrier vertical conveyor 7 (see FIG. 1) (e.g. a lift or elevator) arranged within the footprint of each rack 6 at its front end via the conveyors 4, 40. The racks are serviced by ASRS machines not shown, e.g. shuttles, that drop off loads to the vertical conveyors 7. In this respect, virtual order fulfilment level B is more or less a duplicate of order fulfilment level A and arranged above it. To allow this, some additional installations and changes have been implemented which will be described below.

Conveyor 4*c is a connecting conveyor when conveyor is running the length of the front of the racking 3 across all aisles 5 and possibly on to a not shown packaging area, arranged above conveyor 4c.

The conveyors 4*a, b (in analogy to conveyors 4a, b of FIG. 1, indicated by hashed box) bridge the racking and the picking stations 20, connecting to an inbound product load carrier conveyor 80a, b and an inbound order load carrier conveyor 90a, b and a common take away discharge conveyor 100. These are arranged above the respective elements in the level A, using the airspace directly above. The load carriers themselves can for example be standard containers or trays.

To service conveyor system 4 and 4* at the same time, especially the conveyors 4a, b (see FIGS. 1) and 4*a, b connecting to the racking, load carrier vertical conveyor or AS/RS 7 may be used in an embodiment (not shown) having a duplicate load handling platform vertically spaced to align with the two order fulfilment levels A, B so as to be able to discharge and/or receive articles from both levels at the same time.

The picking stations 20 are manually 11 or robotically R operated. Two picking stations 2, 20, one from each order fulfilment level, are also grouped (see FIG. 4 showing the respective group of manual picking stations 2, 20) in close horizontal relationship to create a densely packaged fulfilment area containing many picking stations.

The vertical spacing is realized by having all elements of the virtual order fulfilment level raised by use of uprights, raised platforms etc. The amount of vertical offset is slightly larger than the height of the containers used as load carriers due to but not limited to conveyor height and clearance between conveyor and load carriers.

Figures 4A, 4B:
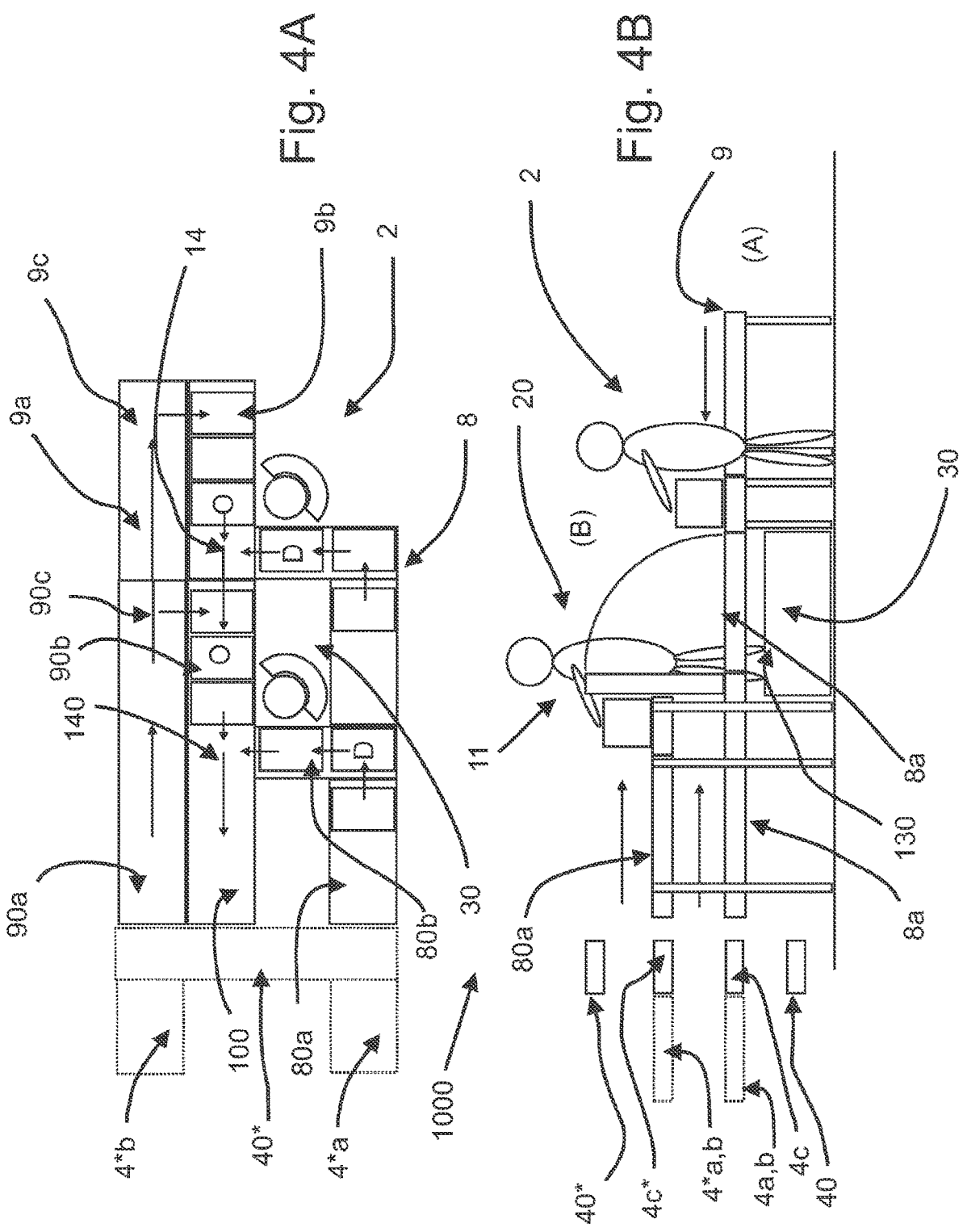
FIGS. 4A and 4B show a schematic plan and side view of a cross aisle and bypass conveyor configuration and connection to picking station according to the invention.

The operating position 130 in the picking station 20 is for example raised by using a platform 30. To allow human operators 11 access to the platform 30 respectively the operating position 130, a section of inbound product load carrier conveyor 8a can be raised as best seen in FIG. 4B or a step-over can be provided if 8a is not raiseable. Such is not needed for robotically operated stations.

As seen in the FIG. 4, virtual order fulfilment level B is independent of order fulfilment level A. Only air space is shared, no conveyor systems. Therefore the use of two bypass conveyors 40, 40* makes sense.

Figures 5A, 5B:
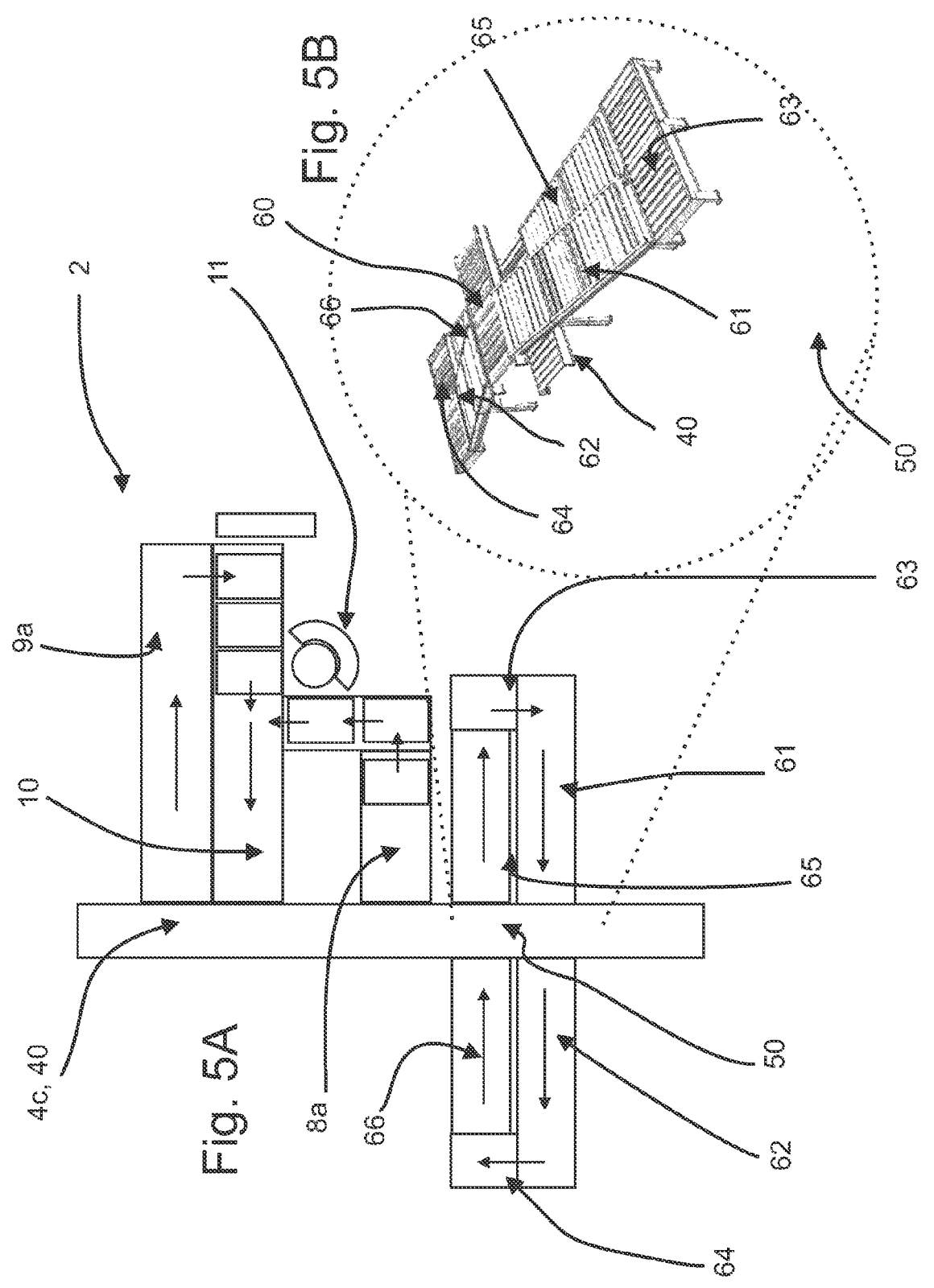
FIGS. 5A and 5B show a schematic plan view of a cross aisle and bypass conveyor configuration and connection to picking station and perspective detailed view of the connecting area of the cross aisle and bypass conveyors according to the invention.
Figure 6:
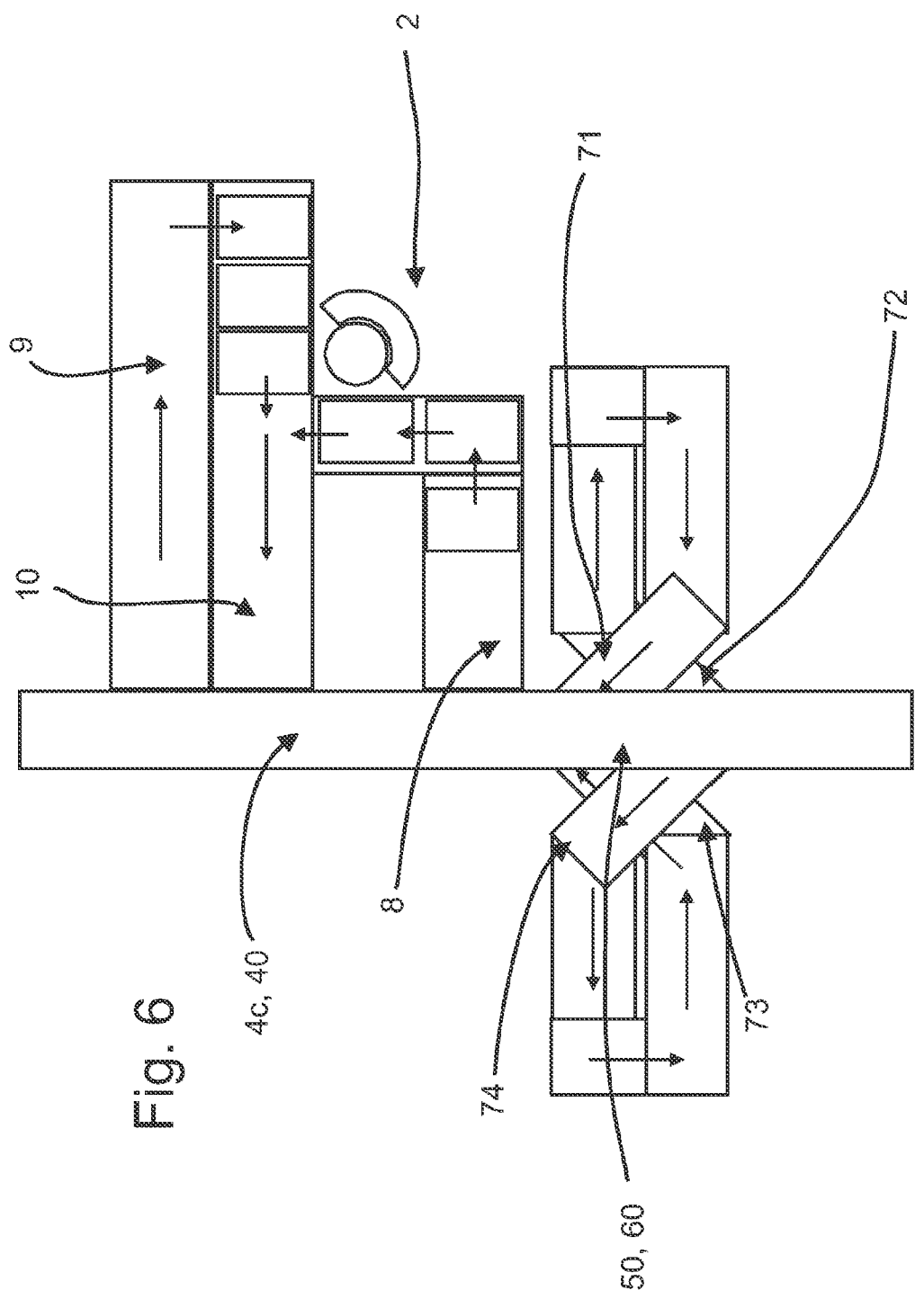
FIG. 6 shows a schematic plan view of a cross aisle and bypass conveyor configuration and connection to picking station according to the invention.
Figure 7:
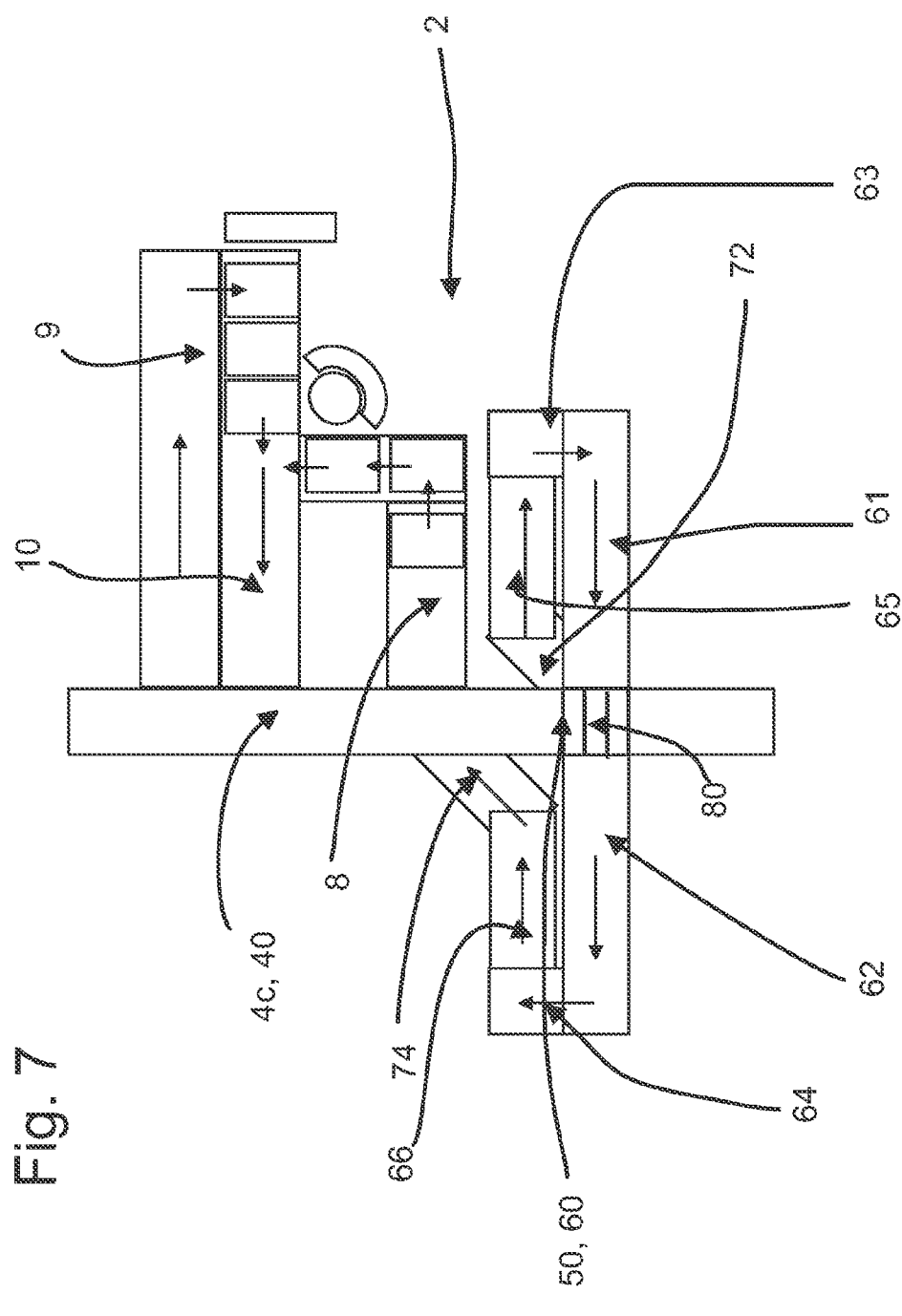
FIG. 7 shows a schematic plan view of a cross aisle and bypass conveyor configuration and connection to picking station according to the invention.

In contrast to FIG. 5, which uses only RATs or tilted conveyor for interfacing the cross aisle conveyor 4c and the connection installation 60, FIGS. 6 and 7 show embodiments with the use of angled merge and divert mechanisms 71, 72, 73, 74 which have higher performance and smoother handling of loads or a combination of said angled merge and divert mechanisms 71, 74 with inclined and declined conveyor ramps 61, 62 having RATs or tilted conveyor.

Merges 73 and 71 flow into bypass conveyor 40 (directly below) and cross aisle conveyor 4c and diverts 72 and 74 discharge from bypass conveyor 40 and cross aisle conveyor 4c, as indicated by the arrows show load flow direction. Angled merge and divert mechanisms 71, 72, 73, 74 are connected by conveyors sections analogous to conveyor sections 61-66 shown in FIG. 5.

In the version of FIG. 7 only angled divert 72 and merge 74 are used in combination with the ramps and conveyor sections 61-66 as shown in FIG. 5 with a RAT or tilted conveyor 80 in the corresponding bypass conveyor 40 (directly below) and cross aisle conveyor 4c.

Figures 8A, 8B:
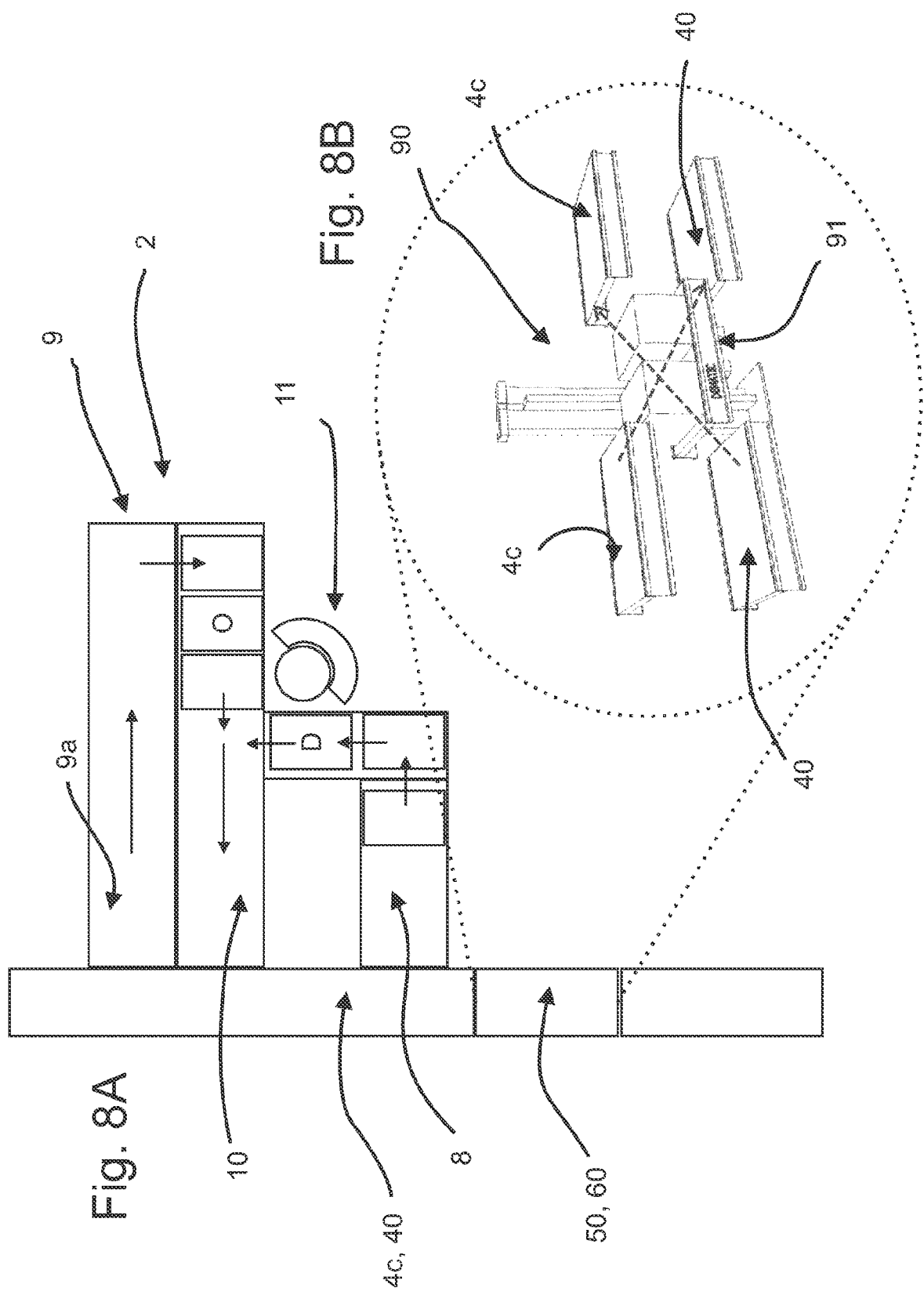
FIGS. 8A and 8B show a schematic plan view of a cross aisle and bypass conveyor configuration and connection to picking station and perspective detailed view of the connecting area of the cross aisle and bypass conveyors according to the invention.

FIG. 8 shows an embodiment that uses a lift, in particular a tandem cycling lift 90 as the connection installation 60 in the connection area 50. This lift 90 has a platform 91 with roller conveyor(s) based spaces for handling one to multiple loads at the same time, i.e. picking up a load and dropping off a load simultaneously (as indicated by FIG. 8B).

Figure 9:
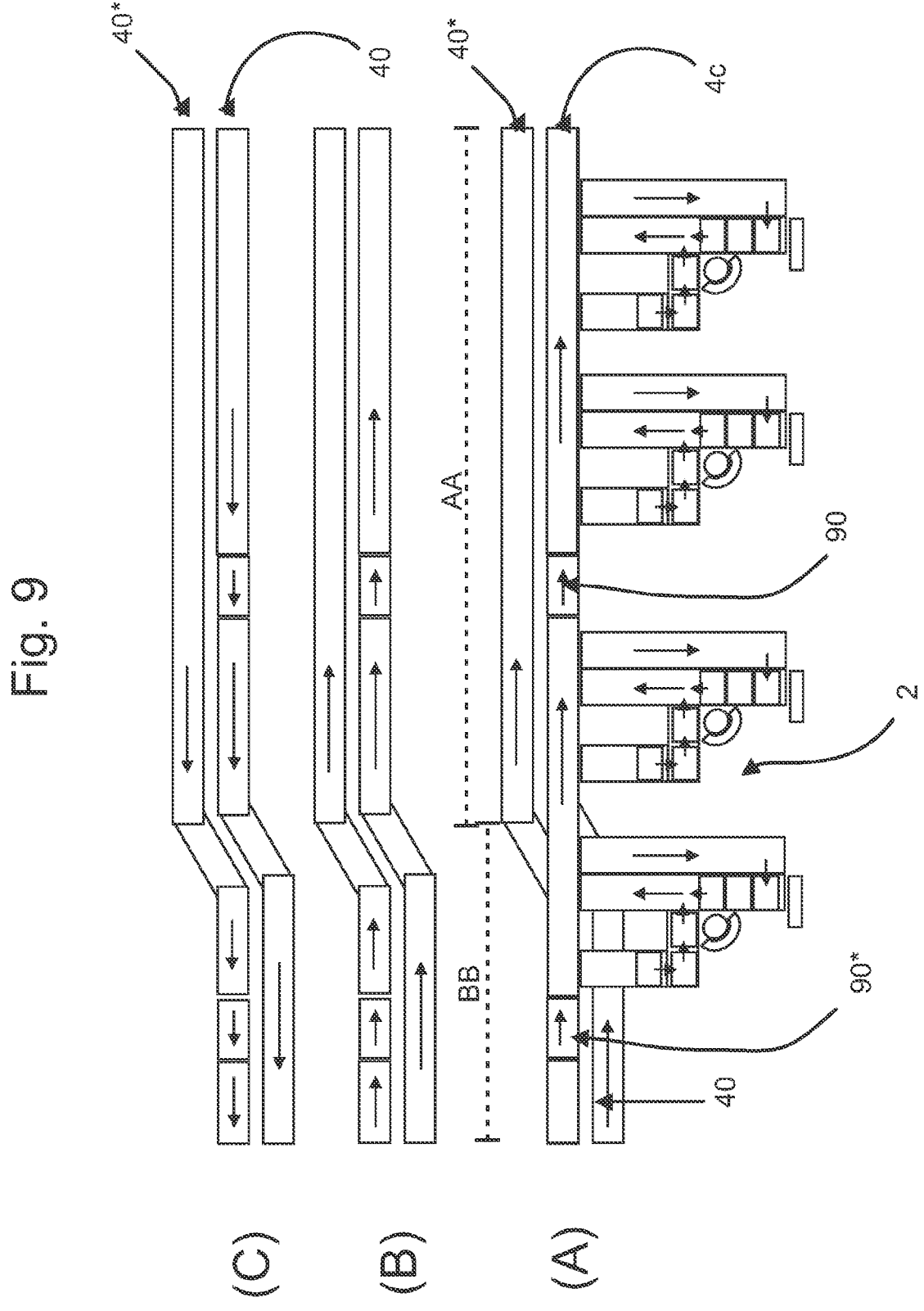
FIGS. 9A, 9B, and 9C show schematic plan views of a cross aisle and bypass conveyor configurations and connection to picking station according to the invention.
Figure 10:
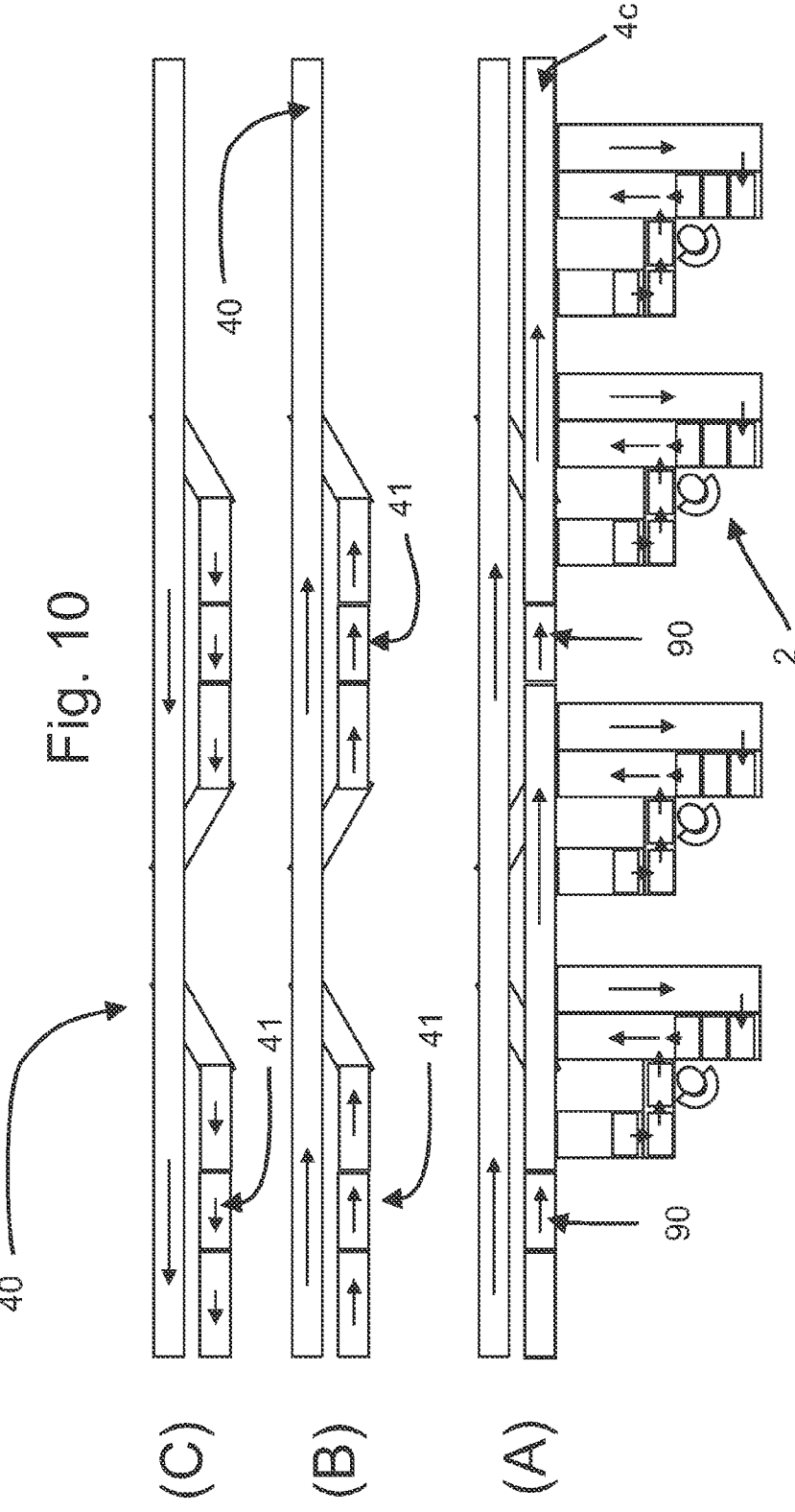
FIGS. 10A, 10B, and 10C show schematic plan views of a cross aisle and bypass conveyor configurations and connection to picking station according to the invention.

FIGS. 9 and 10 show how the bypass conveyor(s) 40, 40* is/are arranged together with lift(s) and with different configurations of the bypass conveyor 40, 40* positioning, direction of transportation as well as number of bypass conveyors 40, 40* used.

In FIG. 9A the cross aisle conveyor 4c is supplemented by two bypass conveyors 40 and 40*. Bypass conveyor 40 runs beneath cross aisle conveyor 4c in a first section AA and bypass conveyor 40* in parallel besides it. Bypass conveyor 40* runs beneath cross aisle conveyor 4c in a second section BB and bypass conveyor 40 in parallel besides it. Lifts 90* interface between bypass conveyor 40* and cross aisle conveyor 4c in the sections AA, whilst lift 90 interfaces between 40 and 4c in the section BB. It means that each lift 90 and 90* interface with dedicated bypass conveyors.

FIG. 9B shows bypass conveyor layout located at lower or upper level of 4c and 40, 40* and 4c have same direction of transportation. FIG. 9C differs in that the direction of transportation of the bypass conveyors 40, 40* schematically shown is opposite to that of the cross aisle conveyor 4c.

In FIGS. 10A, 10B, and 10C one bypass conveyor 40 supplements the cross aisle conveyor 4c. Bypass conveyor 40 runs beneath but diagonally besides cross aisle conveyor 4c with transfer sections 41 curving out and interface with lifts 90 then merges into bypass conveyor 40. It means that each lift 90 interfaces with shared bypass conveyors. As indicated the shared bypass conveyor 40 may have same transportation direction or opposite transportation direction (see FIG. 100).

Figure 11:
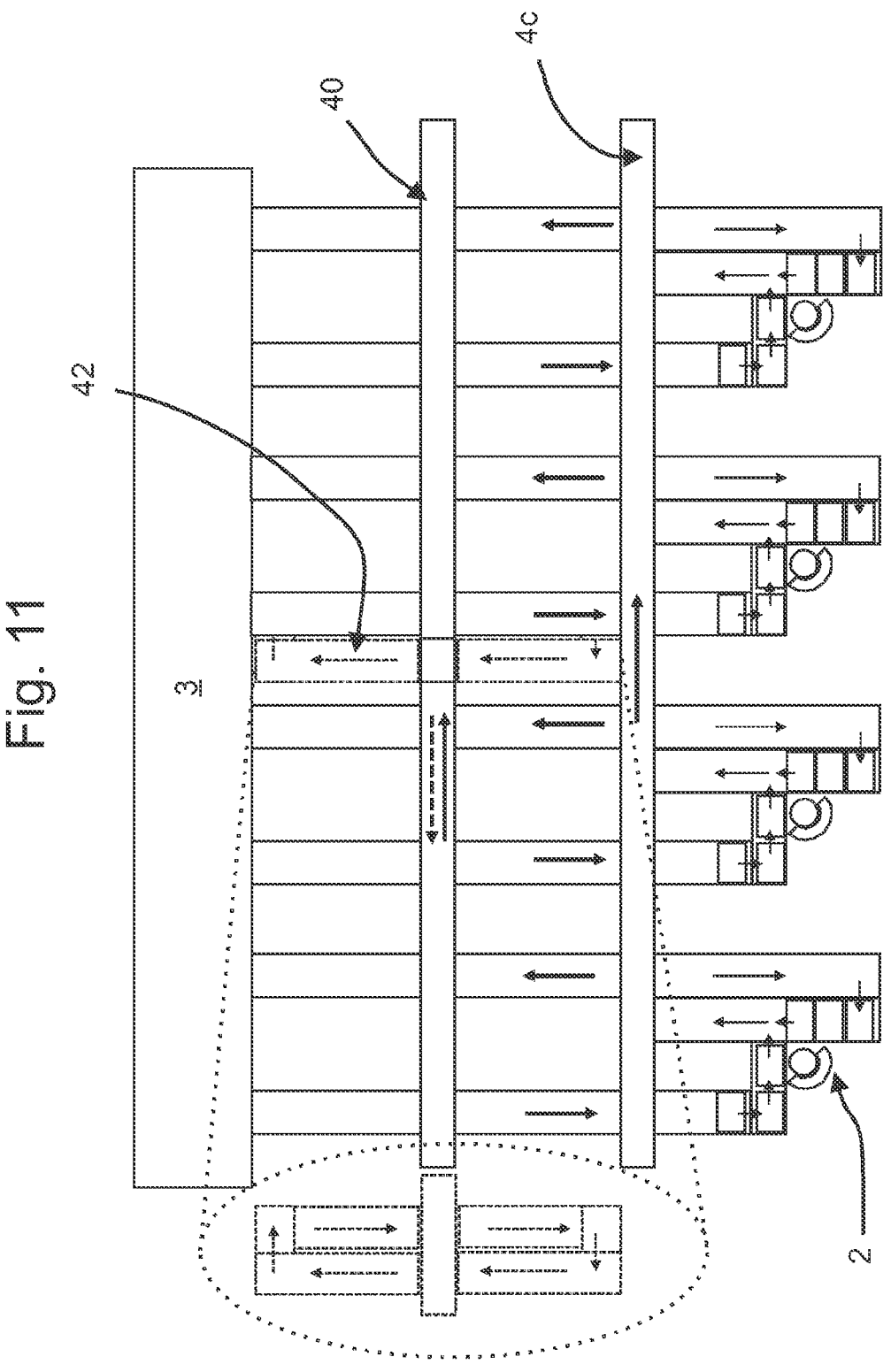
FIG. 11 shows a schematic plan view of a cross aisle and bypass conveyor configuration and connection to picking station according to the invention.

FIG. 11 shows an embodiment in which a bypass conveyor 40 is located horizontally between storage 3 and cross aisle conveyor 4c. It has either same or opposite direction of transportation. Incline/decline conveyor group 42 (see detail in hashed circle) and/or lift can be added in case there is more than one single level bypass conveyor level to connect those conveyors levels.

The invention claimed is:

1. A warehouse for order fulfilment comprising:

at least one order fulfillment area in which picking stations are arranged and supplied with articles from a product storage for picking orders, wherein each picking station is supplied with articles by a connecting conveyor system with said connecting conveyor system also configured for supplying and returning order containers and being used for discharge of emptied product containers and partial orders or finished orders from the respective picking station;

wherein a bypass conveyor is arranged in parallel to the connecting conveyor system such that product and/or order traffic inbound to the picking stations/product storage and outbound from the picking stations/product storage may be off-loaded from the connecting conveyor system to the bypass conveyor so that transported loads not needed in a certain zone or area to which the connecting conveyor system leads are routed by off-loading such traffic to the bypass conveyor;

wherein the connecting conveyor system is a connecting conveyor system arranged between the product storage and the order fulfillment area and picking stations therein;

wherein the product storage comprises a plurality of aisles and the connecting conveyor system is a cross-aisle conveyor running a length of a front of the product storage past all aisles segmenting a pre-zone.

2. The warehouse for order fulfilment according to claim 1, wherein the bypass conveyor is located below or above the connecting conveyor system.

3. The warehouse for order fulfilment according to claim 2, wherein the bypass conveyor is located diagonally underneath or above the connecting conveyor system.

4. The warehouse for order fulfilment according to claim 2, wherein the bypass conveyor is located directly underneath or above the connecting conveyor system.

5. The warehouse for order fulfilment according to claim 1, wherein the bypass conveyor is connected to the connecting conveyor system by means of inclined or declined conveyors, ramps or lifts.

6. The warehouse for order fulfilment according to claim 1, wherein the bypass conveyor is located in the same plane as the connecting conveyor system and is connected by connection conveyors running at angles up to 90 degrees between those two conveyors.

7. The warehouse for order fulfilment according to claim 5, wherein the bypass conveyor is connected with the inclined and declined conveyors by a right angle transfer or tilted conveyor mechanism and/or an angled merge/divert mechanism.

8. The warehouse for order fulfilment according to claim 5, wherein the lift is a single cycling or tandem cycling lift.

9. The warehouse for order fulfilment according to claim 3, wherein a plurality of bypass conveyors are running in parallel and are connected to the connecting conveyor system by lifts.

10. The warehouse for order fulfilment according to claim 5, wherein each lift is connected to a dedicated bypass conveyor.

11. The warehouse for order fulfilment according to claim 5, wherein all lifts are connected to a shared bypass conveyor.

12. The warehouse for order fulfilment according to claim 1, wherein the bypass conveyor is located horizontally between the end of the storage and a first cross aisle conveyor.

13. The warehouse for order fulfilment according to claim 1, wherein the bypass conveyor and connecting conveyor system have the same or opposite conveying direction.

14. A warehouse for order fulfilment comprising:

at least one order fulfillment area in which a plurality of picking stations are arranged and supplied with articles from a product storage for picking orders, wherein the product storage comprises a plurality of racks and a plurality of aisles, and wherein each picking station is supplied with articles by a connecting conveyor system with said connecting conveyor system also configured for supplying and returning order containers from and to the racks and being used for discharge of emptied product containers and partial orders or finished orders from the respective picking station;

wherein a bypass conveyor is arranged in parallel to the connecting conveyor system such that product and/or order traffic inbound to the picking stations/product storage and outbound from the picking stations/product storage may be off-loaded from the connecting conveyor system to the bypass conveyor so that transported loads not needed in a certain zone or area to which the connecting conveyor systems leads are routed by off-loading such traffic to the bypass conveyor;

wherein the connecting conveyor system is a connecting conveyor system arranged between the product storage and the order fulfillment area and picking stations therein; and wherein the product storage comprises a plurality of aisles and the connecting conveyor system is a cross-aisle conveyor running the length of a front of the storage segmenting a pre-zone of the order fulfillment area.

15. The warehouse for order fulfilment according to claim 14, wherein the bypass conveyor is located below or above the connecting conveyor system.

16. The warehouse for order fulfilment according to claim 15, wherein the bypass conveyor is located diagonally underneath or above the connecting conveyor system.

17. The warehouse for order fulfilment according to claim 15, wherein the bypass conveyor is located directly underneath or directly above the connecting conveyor system.

18. The warehouse for order fulfilment according to claim 14, wherein the bypass conveyor is connected to the connecting conveyor system by means of inclined or declined conveyors, ramps or lifts at intervals.

* * * * *